United States Patent
Bajikar

(10) Patent No.: US 6,747,598 B2
(45) Date of Patent: Jun. 8, 2004

(54) METHOD AND APPARATUS FOR CONTROLLING ACCESS TO MOBILE DEVICES

(75) Inventor: Sundeep M. Bajikar, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/417,540

(22) Filed: Apr. 16, 2003

(65) Prior Publication Data

US 2003/0184474 A1 Oct. 2, 2003

Related U.S. Application Data

(62) Division of application No. 10/028,472, filed on Dec. 19, 2001, now Pat. No. 6,577,274.

(51) Int. Cl.$^7$ .............................. G01S 5/02; H04B 7/185
(52) U.S. Cl. ........................... 342/357.17; 342/357.06; 701/213
(58) Field of Search ....................... 342/357.06, 357.17; 701/213

(56) References Cited

U.S. PATENT DOCUMENTS

| | | | |
|---|---|---|---|
| 5,581,261 A | * 12/1996 | Hickman et al. | 342/385 |
| 5,648,763 A | 7/1997 | Long | |
| 5,928,291 A | 7/1999 | Jenkins et al. | |
| 6,313,791 B1 | 11/2001 | Klanke | |
| 6,484,029 B2 | * 11/2002 | Hughes et al. | 455/434 |
| 6,507,279 B2 | 1/2003 | Loof | |

* cited by examiner

Primary Examiner—Theodore M. Blum
(74) Attorney, Agent, or Firm—Blakely, Sokoloff, Taylor & Zafman LLP

(57) ABSTRACT

According to one embodiment, the invention discloses a method comprising determining a position of a mobile device; and controlling access to said mobile device based on said position. According to another embodiment of the invention there is provided a mobile device comprising a positioning mechanism to determine a position a mobile device; and a controlling mechanism to control access to said mobile device based on said position.

15 Claims, 5 Drawing Sheets

METHOD AND APPARATUS FOR CONTROLLING ACCESS TO MOBILE DEVICES

The present patent application is a Divisional of application Ser. No. 10/028,472, filed Dec. 19, 2001 now U.S. Pat. No. 6,577,274.

FIELD OF THE INVENTION

This invention relates to access control. In particular is relates to controlling access to mobile devices.

BACKGROUND

Mobile device s such as notebook computers, Personal Digital Assistants (PDAs) and cellular telephones are typically used in different locations depending on the movement of a user. Depending on where the mobile device is being used, it must be appropriately configured in order to prevent unauthorized use thereof. For example, when the user is on a corporate campus and is connected to a corporate intranet there is no need for data encryption for communications confined to the corporate intranet. Likewise, when the user is at home, security concerns related to unauthorized use of a mobile device would be reduced, whereas these concerns would be higher when the user is in a public place such as an airport or a hotel.

DETAILED DESCRIPTION

According to embodiments of the present invention access control parameters which control access to a mobile device are changed automatically based on the location of the mobile device. In some embodiments of the invention, a user of the mobile device pre-configures a set of security policies with predetermined values for the access control parameters based on knowledge of anticipated usage scenarios. The mobile device then uses an appropriate security policy based on the physical location of the device. Each security policy is associated with a zone which may be user defined. Examples of user defined zones may include a home zone, a work zone, an airport, a hotel zone, etc. Each zone defines the physical region within which the mobile device must be located before the security policy associated with the zone becomes operative. As a user moves around with the mobile device, the position of the mobile device is constantly updated and when the device crosses from one security zone to another, the security policy for that device is appropriately updated without any user intervention.

Figure 1:
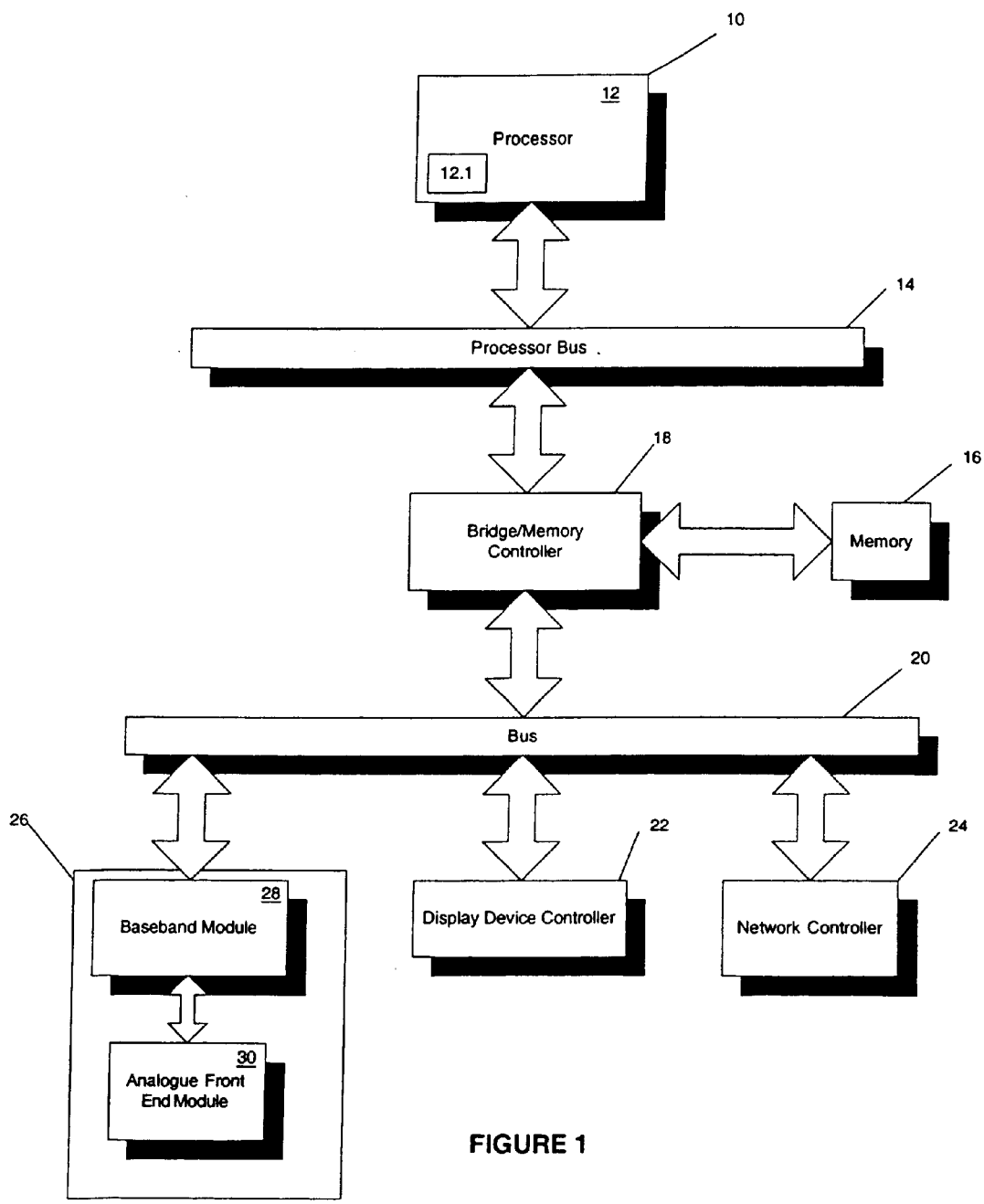
FIG. 1 shows a block diagram of a mobile device in accordance with the invention.

FIG. 1 of the drawings shows one embodiment of a mobile device 10 in accordance with the invention. The device 10 includes a processor 12 that processes data signals. Processor 12 may be a Complex Instruction Set Computer (CISC) microprocessor, a Reduced Instruction Set Computing (RISC) microprocessor, a Very Long Instruction Word (VLIW) microprocessor, a processor implementing a combination of instructions sets, or other processor device.

In one embodiment, processor 12 is a processor in the Pentium® family of processors including the Pentium® 4 family and mobile Pentium® processors available from Intel Corporation of Santa Clara, Calif. Alternatively, other processors may be used. FIG. 1 shows an example of a mobile device 10 employing a single processor. However, one of ordinary skill in the art will appreciate that mobile device 10 may be implemented using multiple processors.

Processor 12 is coupled to a processor bus 14. Processor bus 14 transmits data signals between processor 12 and other components in mobile device 10. Device 10 also includes a memory 16. In one embodiment, memory 16 is a Dynamic Random Access Memory (DRAM) device. However, in other embodiments, memory 16 may be a Static Random Access Memory (SRAM) device, or other memory device.

Memory 16 may store instructions or code represented by data signals that may be executed by processor 12. According to one embodiment of the invention, a cache memory 12.1 resides within processor 12 and stores data signals that are also stored in memory 16. Cache 12.1 speeds up memory accesses by processor 12 by taking advantage of its proximity to processor 12. In another embodiment, cache 12.1 resides external to processor 12.

Mobile device 10 further includes a bridge memory controller 18 coupled to processor bus 14 and memory 16. Bridge/memory controller 18 directs data signals between processor 12, memory 16, and other components in device 10 and bridges the data signals between processor bus 14, memory 16, and a first input/output (I/O) bus 20. In one embodiment, I/O bus 20 may be a single bus or a combination of multiple buses.

In a further embodiment, I/O bus 20 may be a Peripheral Component Interconnect adhering to a Specification Revision 2.1 bus developed by PCI Special Interest Group of Portland, Oreg. In another embodiment, I/O bus 20 may be a Personal Computer Memory Card International Association (PCMCIA) bus developed by PCMCIA of San Jose, Calif. Alternatively, other buses may be used to implement I/O bus 20. I/O bus 20 provides communication links between components in device 10. A display device controller 22 is coupled to I/O bus 20. Display device controller 22 allows coupling of a displayed device to device 10 and acts as an interface between the display device and device 10. In one embodiment, display device controller 22 is a Monochrome Display Adapter (MDA) card. In other embodiments, display device controller 22 may be a Color Graphics Adapter (CGA) card, and Enhanced Graphics Adapter (EGA) card, and Extended Graphics Array (XGA) card or other display device controller. The display device receives data signals from processor 12 through display device controller 22 and displays information and data signals to a user of device 10.

Figure 2:
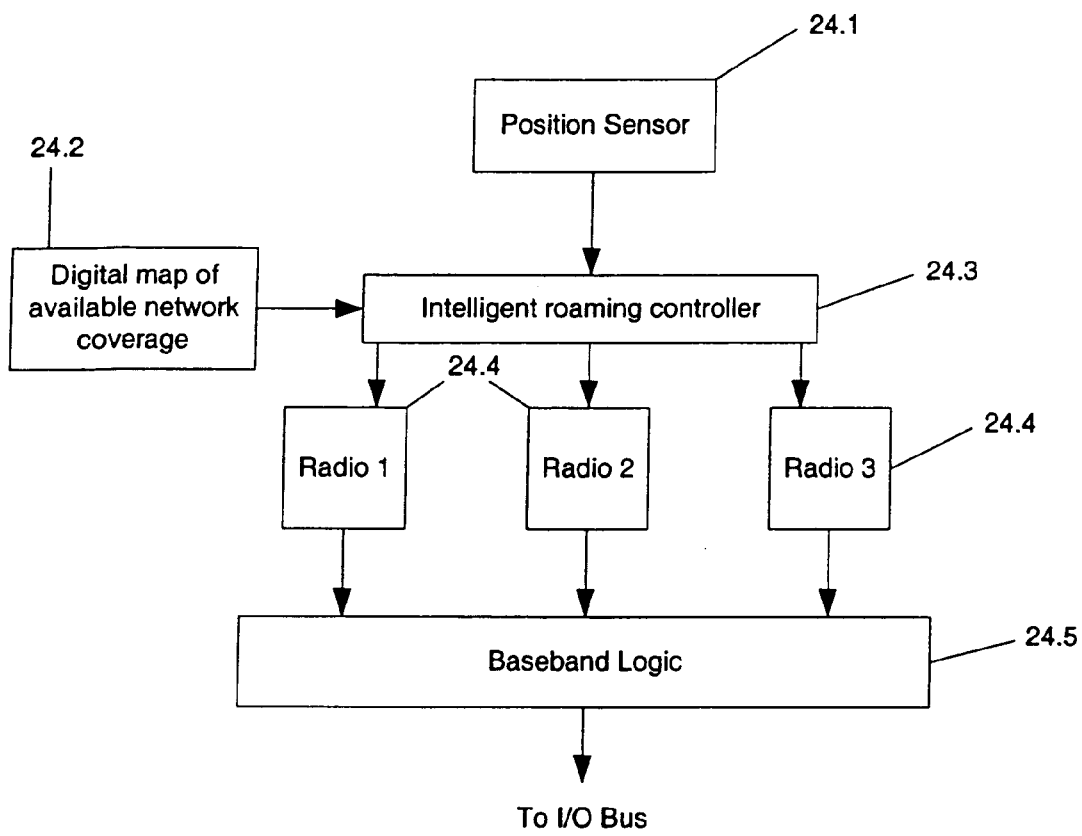
FIG. 2 shows a block diagram of the wireless communications module of the mobile device of FIG. 1 in greater detail.

Mobile device 10 further includes a wireless communications module 24 which is coupled to I/O bus 20. Components of the wireless communications module 24 is shown in greater detail in FIG. 2 of the drawings. Referring to FIG. 2, it will be seen that the wireless communications module 24 includes a position sensor 24.1. The position sensor 24.1 may be any commercially available position sensor and in one embodiment it may be a GPS sensor. The module 24 further includes a digital map 24.2 which is an area coverage map indicating which communications networks are operative at a global position of mobile device 10. The module 24 further includes an intelligent roaming controller 24.3 which provides the functionality of selecting one of radio interfaces 24.4 to connect mobile device 10 to a selected operative communications network as will be described in greater detail below. Finally, the module 24 includes a baseband logic module 24.5. The detailed components within the baseband logic module 24.5 have not been shown. However, one skilled in the art will understand that it will necessarily include components such as a digital signal processor, embedded controller support blocks such as volatile and non-volatile memory, clocks, interface logic and any miscellaneous hardware acceleration blocks required by the radio interfaces 24.4. The baseband logic module 24.5 is coupled to the I/O bus 20.

Figure 3:
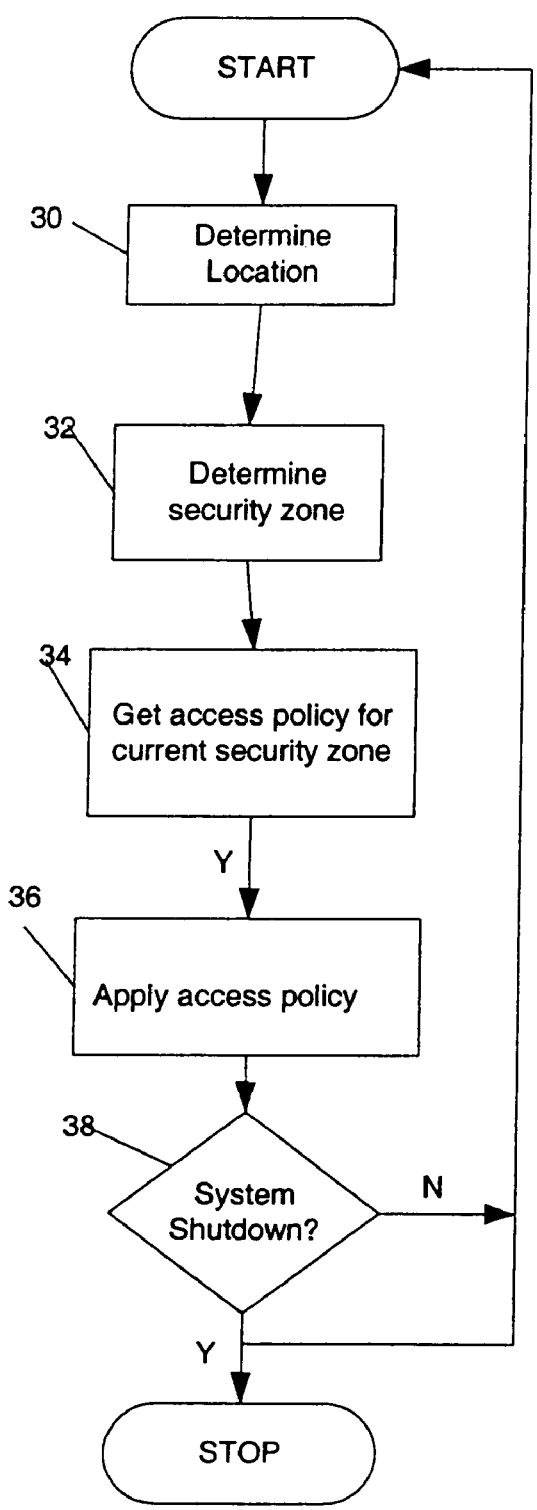
FIG. 3 shows a flowchart of operations performed in order to select an appropriate access policy in accordance with one embodiment of the invention.
Figure 4:
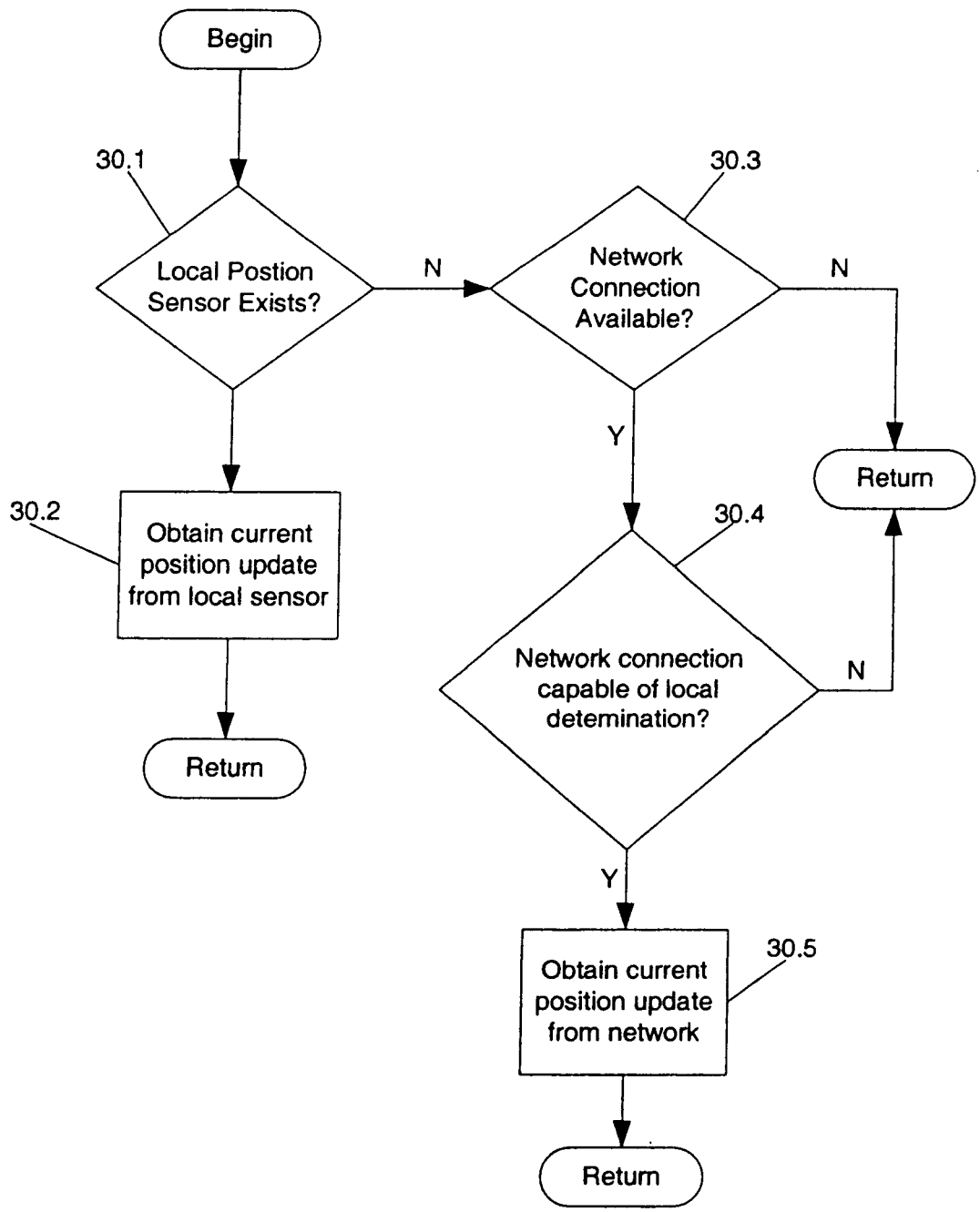
FIGS. 4 and 5 show aspects of operations in FIG. 3 in greater detail.

According to embodiments of the invention, the mobile device 10 may be a mobile device such as a notebook computer, Portable Digital Assistant (PDA), a mobile telephone, etc. The mobile device 10 may be used to perform operations shown in FIG. 3 of the drawings. Referring to FIG. 3, at block 30 the mobile device 10 determines its location relative to a locally defined coordinate system or a global coordinate system. The particular operations performed in order to determine the location of mobile device 10 at block 30 is shown in FIG. 4 of the drawings. Referring to FIG. 4, at block 30.1 a determination is made as to whether a local position sensor exists. If such a position sensor exists then at block 30.2 a current global of mobile device 10 is obtained from said local sensor. Alternatively, if no local sensor exists then at block 30.3, a determination is made as to whether a network connection is available. If a network connection is available then at block 30.4 a check is made to determine if the network connection is capable of determining the current position of mobile device 10. According to one embodiment of the invention, this may be achieved by accessing a database of services provided by a network operator, for which services a current user of mobile device 10 is subscribed. If the network connection is capable of determining a current position of mobile device 10 then at block 30.5 said current position is obtained from the network. Obtaining the current position involves sending a triangulation signal to the network operator, who would then triangulate a signal, and receiving said triangulated signal.

Figure 5:
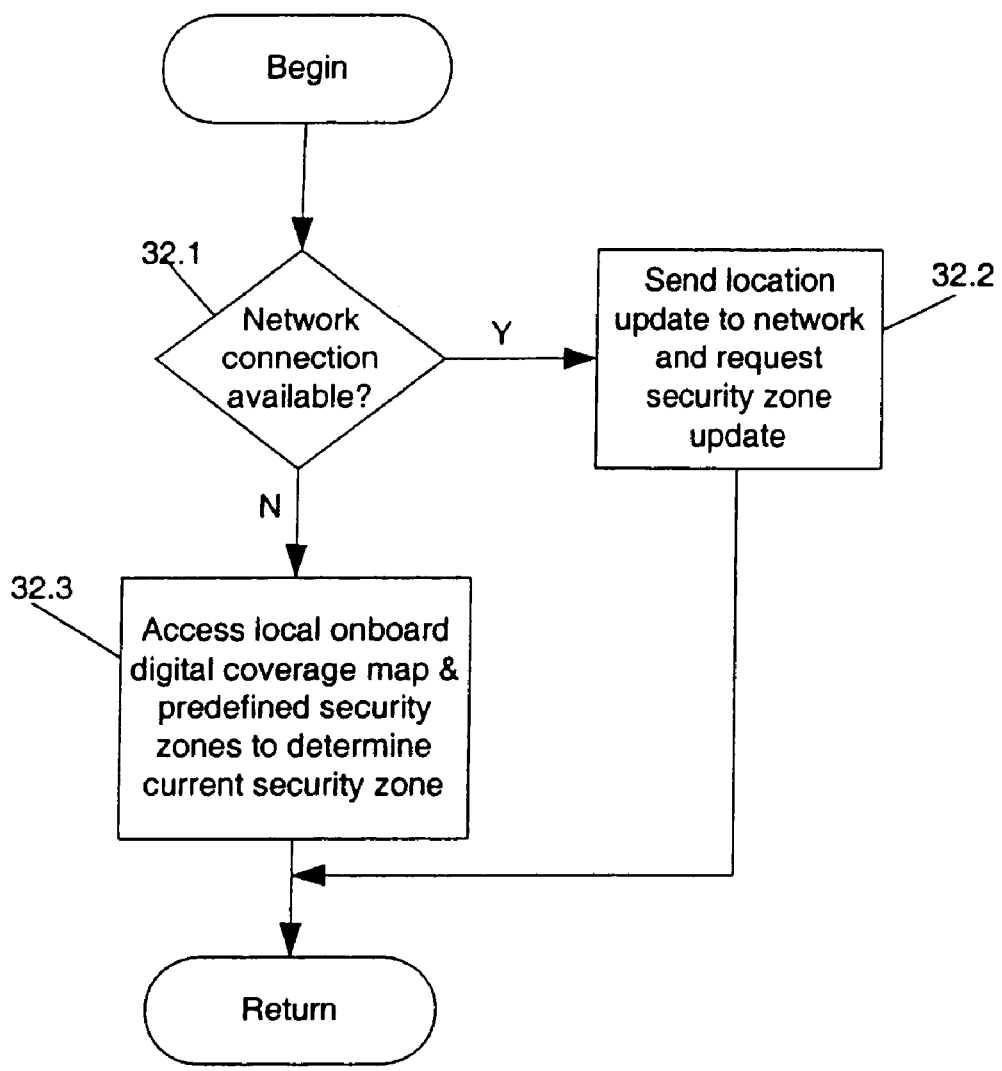

Referring now to FIG. 3 of the drawings, after the position/location of mobile device 10 has been determined at block 30, at block 32 the security zone in which mobile device 10 is operating is determined. The particular operations involved in determining the security zone at block 32 are shown in greater detail in FIG. 5 of the drawings. Referring to FIG. 5, at block 32.1 a determination is made as to whether a network connection is available. If a network connection is available then at block 32.2 location information is sent to the network and based on this information a request is made for an update to the current security zone within which the mobile device 10 is operating. If no network coverage is available then at block 32.3 a digital network coverage map including security zones is accessed in order to determine the current security zone. Each security zone is determined in accordance with the current location or position of mobile device 10. Typically, security zones are user-defined for locations such as a home location, a work location, an airport location, hotel location, etc. Associated with each security zone is an access protocol which configures access control parameters to mobile device 10 which will determine, for example, whether a screen saver locks, and hence requires passwords to re-authenticate, a lead idle time before the screen saver locks, when to power down the apparatus, when to reset the apparatus and require re-authentication, when to use automatic roaming, when to make electronic payments and the type of external access request that may be accepted.

Referring again to FIG. 3 of the drawings, at block 34 the appropriate access policy for the current security zone is obtained and applied at block 36. At block 38 a determination is made as to whether a system shut down request has been received. If a system shut down request has been received then the system shuts down, failing which operations starting at block 30 are repeated.

One advantage of the present invention is that it provides a security system that is capable of modifying the access policy of a mobile device based on the location of the device.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory device s; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the techniques are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:
   receiving input from a user of a mobile processing system, the input defining a first location and first configuration for the mobile processing system associated with the first location;
   determining a current position of the mobile processing system; and
   changing a configuration of the mobile processing system to the first configuration if the current position matches the first location, wherein the configuration comprises parameters selected from the group consisting of parameters controlling whether a screen saver for the mobile processing system locks, parameters to control a lead idle time before the screen saver locks, parameters to control when to power down the mobile processing system, parameters to control when re-authentication of the user is required, parameters that control whether to process electronic payments requested by the user, and parameters to control what types of external access requests to allow.

2. The method of claim 1, wherein the receiving further comprises input defining a second location and a second configuration for the mobile processing system associated with the second location; and the changing comprises changing to the second configuration if the current position matches the second configuration.

3. The method of claim 2, wherein the location is selected from the group consisting of a work zone, a home zone, a hotel zone, and an airport zone.

4. The method of claim 3, wherein the first and second configurations comprise parameters controlling whether a screen saver for the mobile processing system locks.

5. A method comprising:
determining in which one of a plurality of user-defined zones a mobile processing system is operative;
determining a user-defined configuration for the mobile processing system associated with the zone; and
changing a current configuration of the mobile processing system to the user-defined configuration without user input, wherein the user-defined configuration comprises settings selected from the group consisting of settings to control whether transactions involving electronic payments may be processed or not, and settings to control what type of external access requests to allow.

6. The method of claim 5, further comprising receiving input from the user, the input predefining each zone.

7. The method of claim 5, wherein each zone is selected from the group comprising a work zone, a home zone, a hotel zone, and an airport zone.

8. The method of claim 7, further comprising first receiving input from the user, the input predefining a user-defined configuration associated with each zone.

9. The method of claim 8, wherein each predefined configuration comprises settings to control if user identification is required in order to access the mobile processing system.

10. A computer-readable storage medium having stored thereon a sequence of instructions which when executed by a processing system cause the system to perform operations comprising:
receiving input from a user of a mobile processing system, the input defining a first location and a first configuration for the mobile processing system associated with the first location;
determining a current position of the mobile processing system; and
changing a configuration of the mobile processing system to the first configuration if the current position matches the first location, wherein the configuration comprises parameters selected from the group consisting of parameters to control whether a screen saver for the mobile processing system locks, parameters to control a lead idle time before the screen savers locks, parameters which control when to power down the mobile processing system, parameters to control when re-authentication of the user is required, parameters that control whether to process electronic payments requested by the user, and parameters to control what types of external access requests to allow.

11. The computer-readable storage medium of claim 10, wherein the receiving further comprises input defining a second location and a second configuration for the mobile processing system associated with the second location; and the changing comprises changing to the second configuration if the current position matches the second configuration.

12. A computer-readable storage medium having stored thereon a sequence of instructions which when executed by a processing system cause the processing system to perform operations comprising:
determining in which one of a plurality of user-defined zones the processing system is operative;
determining a user-defined configuration for the processing system associated with the zone; and
changing a current configuration of the processing system to the user-defined configuration without user input, wherein the user-defined configuration comprises settings selected from the group consisting of settings to control whether transactions involving electronic payments may be processed or not, and settings to control what types of external access requests to allow.

13. The computer-readable storage medium of claim 12, wherein the method further comprises receiving user input, the user input predefining each zone.

14. A mobile processing system comprising:
a unit to determine in which one of a plurality of user-defined zones the mobile processing system is operative;
a unit to determine a user-defined configuration for the mobile processing system associated with the zone in which the mobile processing system is operative; and
a unit to change a current configuration of the mobile processing system to the user-defined configuration without user input; wherein the user-defined configuration comprises settings selected from the group consisting of settings to control whether transactions involving electronic payments may be processed or not; and settings to control what types of external access requests to allow.

15. The system of claim 14, further comprising a unit to store user input predefining each zone.

* * * * *